US012607542B2

(12) United States Patent
Mou et al.

(10) Patent No.: US 12,607,542 B2
(45) Date of Patent: Apr. 21, 2026

(54) DEVICE FOR DETECTING GAS AND CONTROLLING VOLUME OF CLEAN GAS

(71) Applicant: Microjet Technology Co., Ltd., Hsinchu (TW)

(72) Inventors: Hao-Jan Mou, Hsinchu (TW); Chin-Chuan Wu, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 464 days.

(21) Appl. No.: 18/118,383

(22) Filed: Mar. 7, 2023

(65) Prior Publication Data

US 2023/0304904 A1 Sep. 28, 2023

(30) Foreign Application Priority Data

Mar. 25, 2022 (TW) .................................. 111111370

(51) Int. Cl.
*G01N 1/22* (2006.01)
*B01D 46/42* (2006.01)
(Continued)

(52) U.S. Cl.
CPC ......... *G01N 1/2273* (2013.01); *B01D 46/429* (2013.01); *B01D 46/442* (2013.01);
(Continued)

(58) Field of Classification Search
CPC .................................................. G01N 33/0009
(Continued)

(56) References Cited

U.S. PATENT DOCUMENTS

2015/0290572 A1* 10/2015 Stoner, Jr. .......... B01D 46/4254
55/504
2020/0156084 A1* 5/2020 Mou ......................... B03C 3/32
(Continued)

FOREIGN PATENT DOCUMENTS

CN 204593780 U 8/2015
CN 109751735 A 5/2019
(Continued)

OTHER PUBLICATIONS

Manzoul, M. A. Multi-functional protective relay on FPGA, Micro-electronics Reliability, vol. 38 (1998), pp. 1963-1968 (hereinafter referred to as Manzoul). (Year: 1998).*
(Continued)

*Primary Examiner* — Jennifer Dieterle
*Assistant Examiner* — Rachel Marie Slaugovsky
(74) *Attorney, Agent, or Firm* — Birch, Stewart, Kolasch & Birch, LLP

(57) ABSTRACT

A device for detecting gas and controlling volume of clean gas includes a gas detection module and a gas guider. The gas detection module includes a control circuit board, a gas detection main part and a microprocessor, wherein the gas detection main part detects a gas to generate a signal and transmits the signal to the microprocessor for calculating and processing so as to generate a gas detection data, and the microprocessor outputs a power signal and a pulse-width modulation (PWM) signal according to the gas detection data. The gas guider receives the power signal and the PWM signal outputted by the microprocessor, the gas guider is enabled or disabled, as well as a rotation speed and an output volume of clean gas of the at least one gas guider are adjusted according to the power signal and the PWM signal.

15 Claims, 19 Drawing Sheets

(51) Int. Cl.

| | |
|---|---|
| *B01D 46/44* | (2006.01) |
| *B01D 46/46* | (2006.01) |
| *F24F 8/10* | (2021.01) |
| *F24F 11/74* | (2018.01) |
| *F24F 110/64* | (2018.01) |
| *G01N 1/24* | (2006.01) |
| *F24F 110/66* | (2018.01) |
| *G01N 15/075* | (2024.01) |

(52) U.S. Cl.
CPC ................ *B01D 46/46* (2013.01); *F24F 8/10* (2021.01); *F24F 11/74* (2018.01); *G01N 1/24* (2013.01); *F24F 2110/64* (2018.01); *F24F 2110/66* (2018.01); *G01N 15/075* (2024.01)

(58) Field of Classification Search
USPC .......................................................... 73/1.06
See application file for complete search history.

(56) References Cited

U.S. PATENT DOCUMENTS

| | | | | |
|---|---|---|---|---|
| 2020/0292437 A1* | 9/2020 | Mou | .................. | G01N 15/0211 |
| 2021/0245087 A1 | 8/2021 | Mou et al. | | |
| 2022/0057091 A1 | 2/2022 | Mou et al. | | |

FOREIGN PATENT DOCUMENTS

| | | | | | |
|---|---|---|---|---|---|
| CN | 212031429 U | 11/2020 | | | |
| CN | 213334835 U | 6/2021 | | | |
| CN | 113075096 A | 7/2021 | | | |
| CN | 113251541 A | 8/2021 | | | |
| CN | 113252517 A | 8/2021 | | | |
| CN | 113280446 A | 8/2021 | | | |
| CN | 214150600 U | 9/2021 | | | |
| GB | 2420616 A | * 5/2006 | ............ | G08B 21/12 |
| JP | 11-239707 A | 9/1999 | | | |
| JP | 2001-241732 A | 9/2001 | | | |
| JP | 2002-319472 A | 10/2002 | | | |
| JP | 2019-27777 A | 2/2019 | | | |
| JP | 2019-109225 A | 7/2019 | | | |
| JP | 2019-128349 A | 8/2019 | | | |
| JP | 2021-67406 A | 4/2021 | | | |
| JP | 2022-153265 A | 10/2022 | | | |
| TW | 201144707 A1 | 12/2011 | | | |
| TW | M489422 U | 11/2014 | | | |
| TW | 202124025 A | 7/2021 | | | |
| TW | 214249980 U | 9/2021 | | | |
| TW | 202208050 A | 3/2022 | | | |

OTHER PUBLICATIONS

Extended European Search Report for European Application No. 23160436.4, dated Jul. 24, 2023.

* cited by examiner

1

1b

1d

1a

1c

DEVICE FOR DETECTING GAS AND CONTROLLING VOLUME OF CLEAN GAS

CROSS-REFERENCE TO RELATED APPLICATION

This application claims priority to Taiwan Patent Application No. 111111370 filed on Mar. 25, 2022. The entire contents of the above-mentioned patent application are incorporated herein by reference for all purposes.

FIELD OF THE INVENTION

The present disclosure relates to a device for controlling a volume of a clean gas, and more particularly to a device for controlling the volume of the clean gas according to a gas detection.

BACKGROUND OF THE INVENTION

In recent years, people pay more and more attention to the air quality around their living environment. Gases, such as volatile organic compounds (VOC) and particulate matter 2.5 (PM2.5), and even suspended particles contained in the air which are exposed in the environment might affect human health, and even endanger people's life in severe condition. Therefore, the quality of the ambient air has attracted more attentions in various countries, and how to monitor and avoid the harm is an urgent topic.

It is known to a gas detector can be utilized to monitor the ambient air for determining the air quality. Accordingly, if the monitoring information can be provided in real time to warn people in the harmful environment, people can take a precaution or get away immediately, so as to avoid from the health impact and injury caused by exposing to harmful gases in the environment. Thus, utilizing the gas detector to monitor the ambient air is an appropriate and well application. Further, it is also known that the air purification device is an air pollution solution for modern people to prevent from inhaling harmful gases. Therefore, the main subject of the present disclosure is to combine the air purification device and the gas detector, so that the air quality can be monitored in real time, and the volume of clean gas from the air purification device can be controlled according to the monitored air quality, thereby achieving a best benefit of improving and purifying the air quality near a user.

SUMMARY OF THE INVENTION

The object of the present disclosure is to provide a device for detecting gas and controlling volume of clean gas, in which a gas detector is combined with an air purification device, so that the air quality can be monitored in real time, and the volume of clean gas from the air purification device can be controlled according to the monitored air quality, thereby achieving a best benefit of improving and purifying the air quality near a user.

In accordance with an aspect of the present invention, a device for detecting gas and controlling volume of clean gas includes a gas detection module, the gas detection module further including a control circuit board, a gas detection main part and a microprocessor, wherein the gas detection main part detects a gas to generate a signal and transmits the signal to the microprocessor for calculating and processing to generate a gas detection data, and the microprocessor outputs at least one power signal and a pulse-width modulation (PWM) signal according to the gas detection data; and at least one gas guider receiving the at least one power signal and the PWM signal outputted by the microprocessor, wherein the at least one gas guider is enabled or disabled, as well as a rotation speed and an output volume of clean gas of the at least one gas guider are adjusted according to the at least one power signal and the PWM signal.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
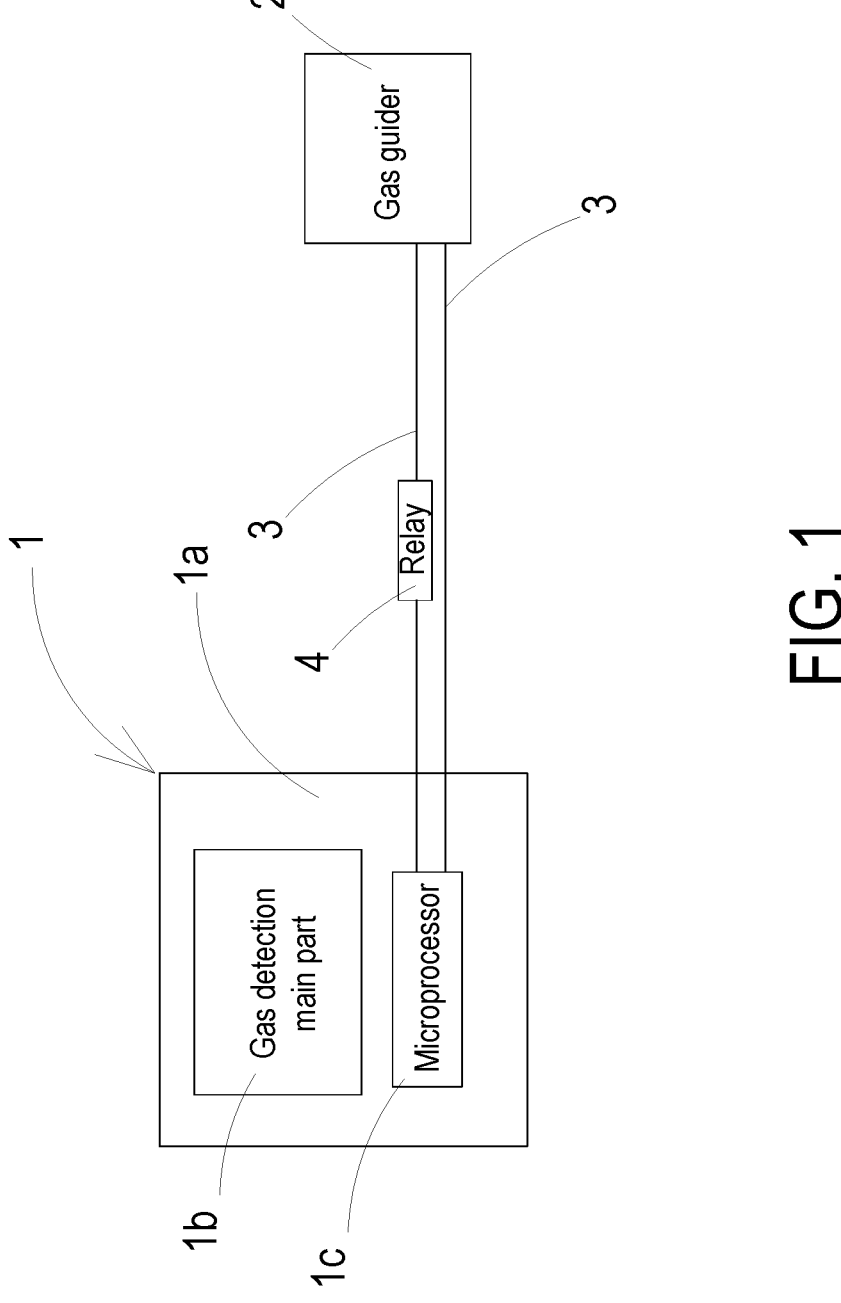
FIG. 1 is a circuit block illustrating the driving and controlling circuitry for controlling a volume of clean gas according to an embodiment of the present disclosure.
Figure 2:
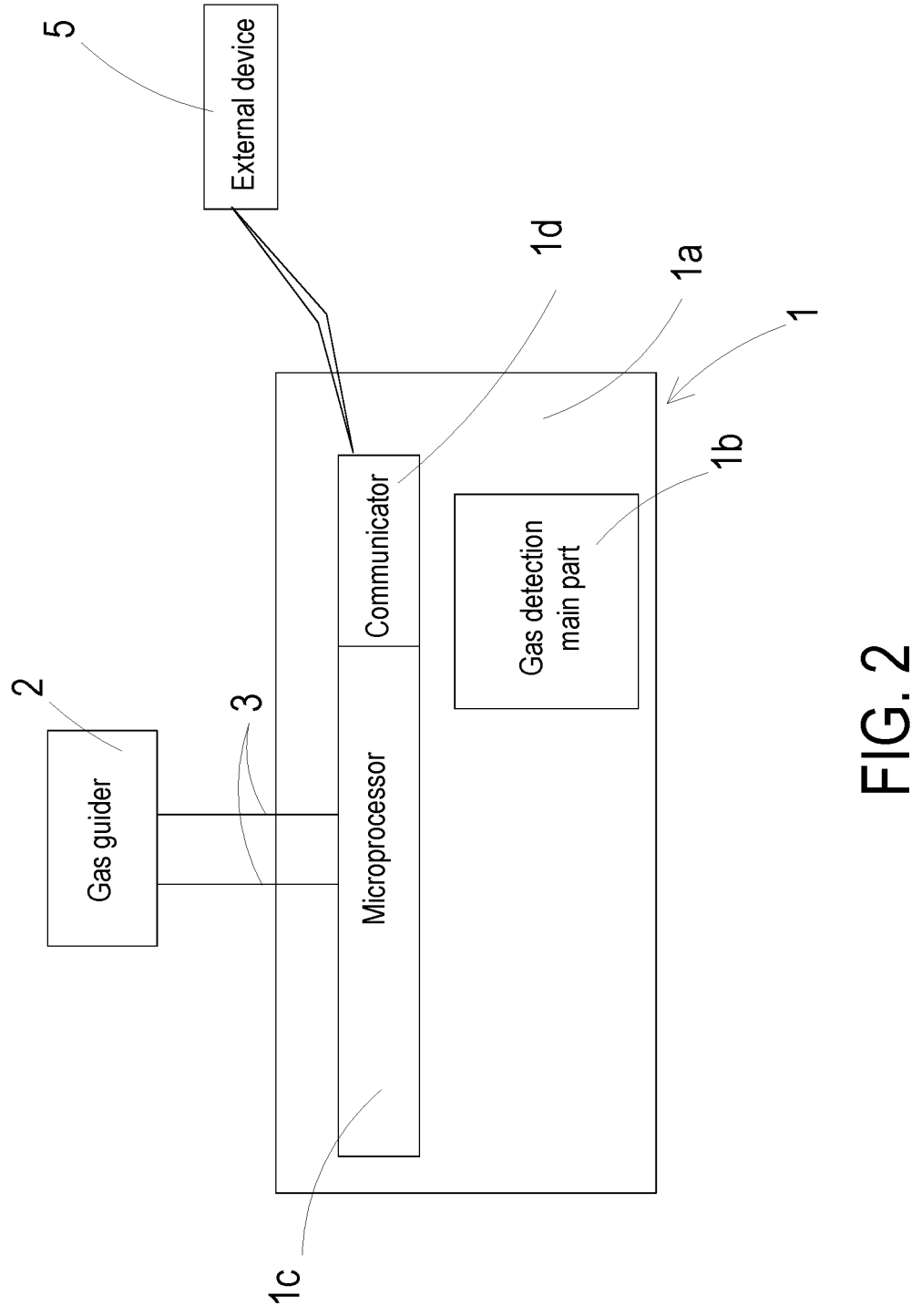
FIG. 2 is a schematic view illustrating a device for detecting gas and controlling volume of clean gas according to an embodiment of the present disclosure.

Please refer to FIG. 1 and FIG. 2. The present disclosure provides a device for detecting gas and controlling volume of clean gas including a gas detection module 1 and at least one gas guider 2. The gas detection module 1 detects a gas to generate a gas detection data and converts the gas detection data into at least one power signal and a PWM (Pulse-Width Modulation) signal for outputting to the gas guider 2. Accordingly, based on the gas detection data, the gas guider 2 is enabled or disabled, and a rotation speed of the gas guider 2 is adjusted for changing a volume of clean gas therefrom.

Figure 5:
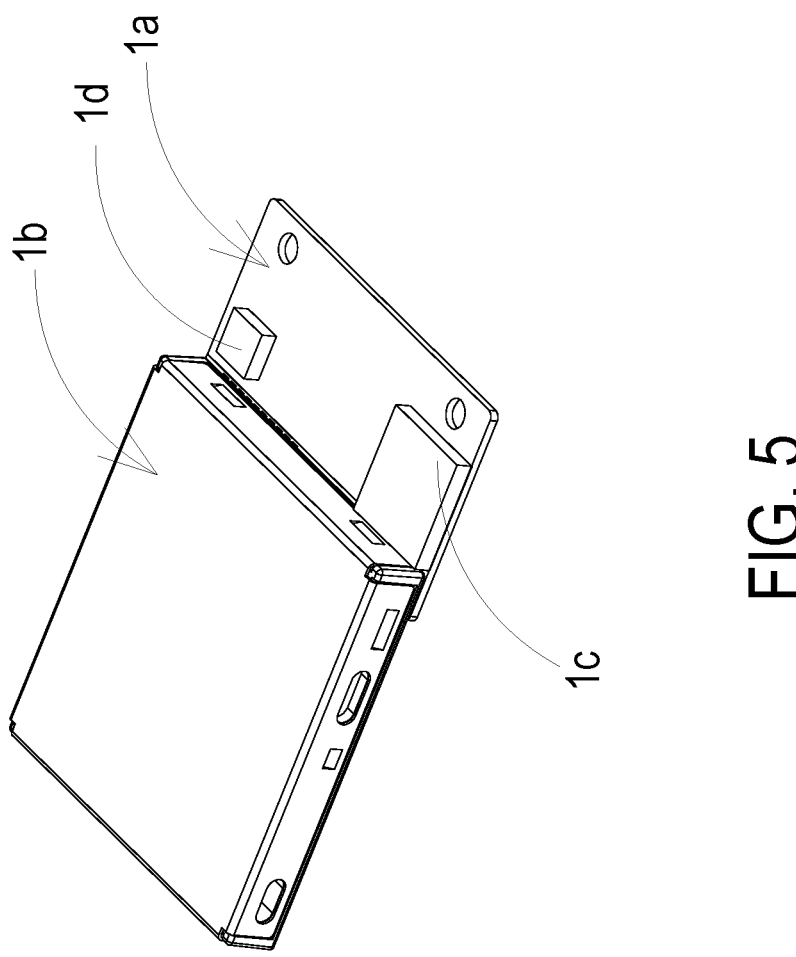
FIG. 5 is a schematic view illustrating the appearance of a gas detection module according to an embodiment of the present disclosure.

The gas detection module 1 mentioned above includes a control circuit board 1a, a gas detection main part 1b and a microprocessor 1c. The gas detection main part 1b and the microprocessor 1c are integrally packaged on and electrically connected with the control circuit board 1a (as shown in FIG. 5). The gas detection main part 1b detects a gas to generate a signal and transmits the signal to the microprocessor 1c for calculating and processing so as to generate a gas detection data. Base on the gas detection data, the microprocessor 1c further outputs at least one power signal and a PWM signal. The gas guider 2 receives the least one power signal and the PWM signal outputted from the microprocessor 1c, and based thereon, the gas guider 2 is enabled or disabled and a rotation speed of the gas guider 2 and also the output volume of clean gas therefrom are adjusted. The microprocessor 1c is electrically connected to the gas guider 2 through at least one wire 3 and also transmits the power signal and the PWM signal to the gas guider 2 through the wire 3. A relay 4 is further disposed on the above-mentioned wire 3 to form a buffer switch so as to achieve a voltage protection for the microprocessor 1c. In one embodiment, the gas guider 2 is a direct current (DC) fan.

As shown in FIG. 2, the gas detection module 1 further includes a communicator 1d which is integrally packaged on and electrically connected with the control circuit board 1a (as shown in FIG. 5). The microprocessor 1c receives, calculates and processes the signal generated after detecting the gas so as to generate a gas detection data for providing to the communicator 11d to perform an external transmission. The communicator 11d transmits the gas detection data externally to an external device 5, and the external device 5 receives and displays the gas detection data, and accordingly, generates a notification alert. In one embodiment, the external device 5 is a mobile device.

Figure 3:
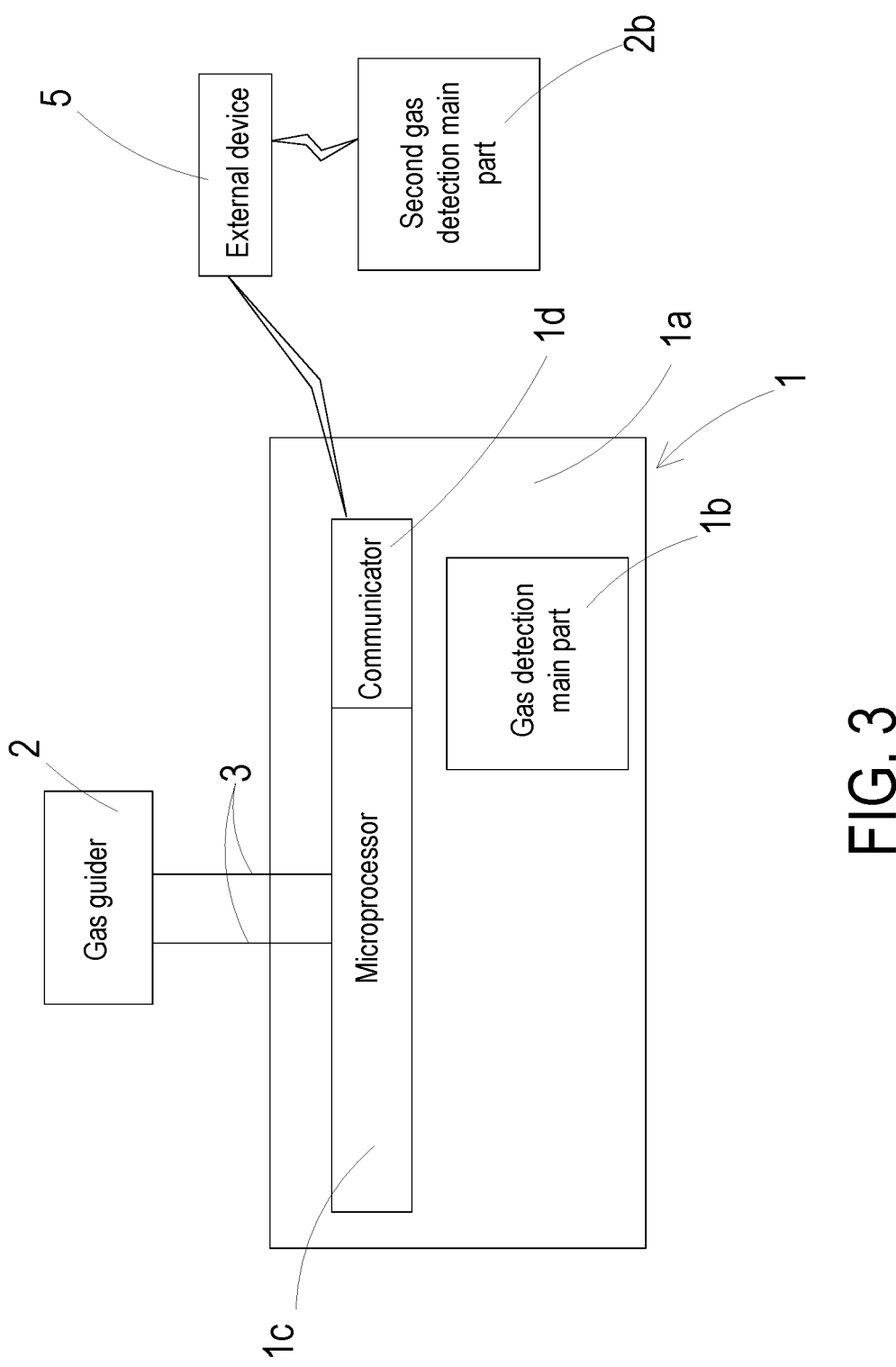
FIG. 3 is a schematic view illustrating the device for detecting gas and controlling volume of clean gas according to another embodiment of the present disclosure.

Please refer to FIG. 3. In another embodiment, the device for detecting gas and controlling volume of clean gas of the present disclosure further includes at least one second gas detection main part 2b. The second gas detection main part 2b is provided for generating and outputting another gas detection data to the external device 5. Then, the external device 5 receives the another gas detection data and transmits thereof to the microprocessor 1c via the communicator 11d. The microprocessor 11c receives, calculates and processes the another gas detection data for outputting the power signal and the PWM signal to the gas guider 2, so as to enable or disable the gas guider 2 and adjust the rotation speed thereof and the output volume of clean gas therefrom.

Figure 4:
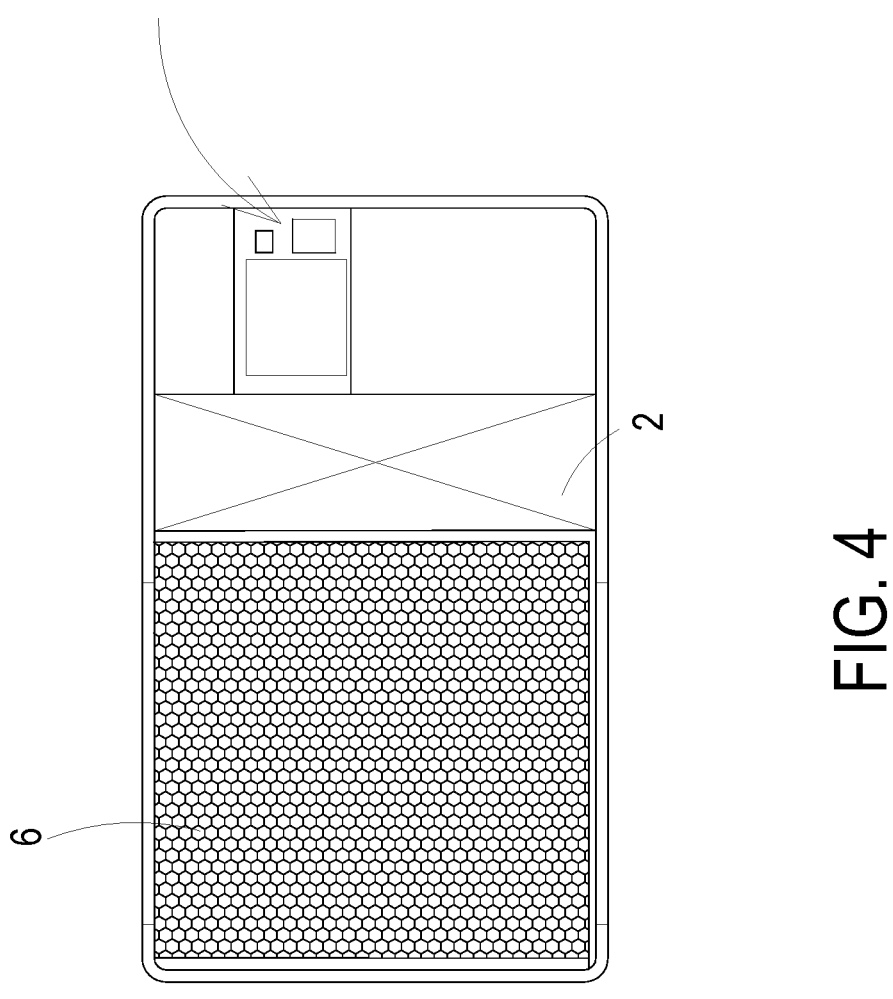
FIG. 4 is a schematic view illustrating the structure of an air purification device according to an embodiment of the present disclosure.

Accordingly, the device for detecting gas and controlling volume of clean gas of the present disclosure includes a gas detection module 1 and a gas guider 2, in which the gas detection module 1 detects a gas to output a gas detection data and converts the gas detection gas into at least one power signal and a PWM signal for providing to the gas guider 2, so that based on the gas detection data, the gas guider 2 is enabled or disabled, and the rotation speed thereof and the output volume of clean gas therefrom are adjusted. Through combining the configuration described above with a filter material 6 as shown in FIG. 4, an air purification device can be formed to monitor the air quality and control the output volume of clean gas according to the air quality, thereby achieving the best benefit of improving and purifying the air quality near a user.

The detailed structure of the gas detection main part 1b of the device for detecting gas and controlling volume of clean gas of the present disclosure is explained as follows.

Figure 6A:
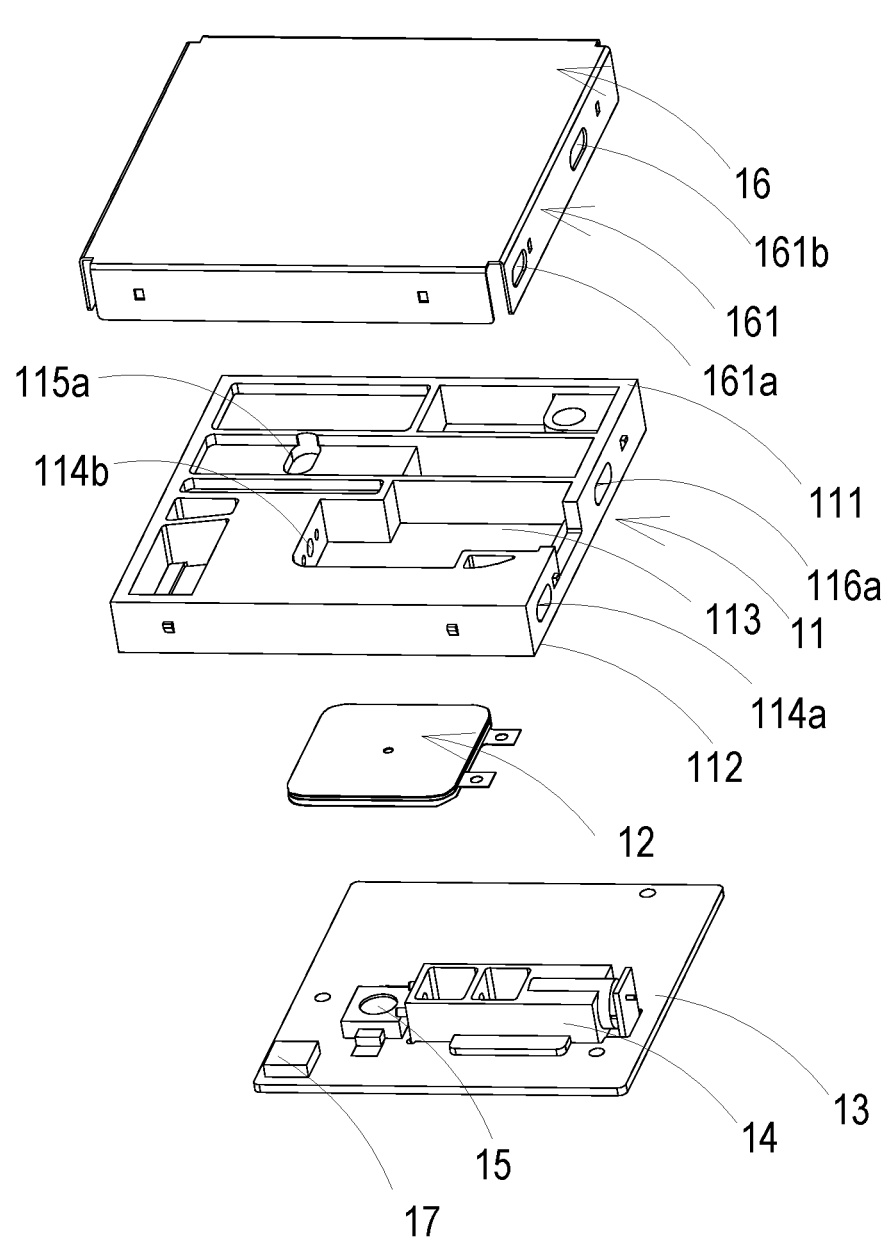
FIG. 6A is a schematic exploded view illustrating a gas detection main part according to an embodiment of the present disclosure.
Figure 6B:
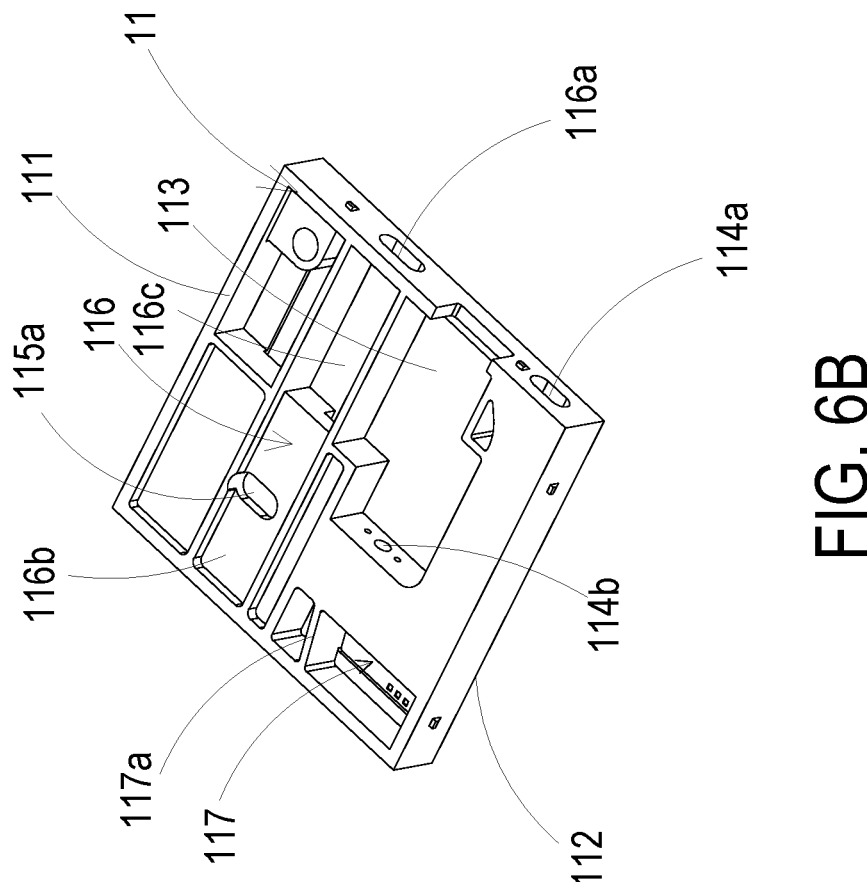
FIG. 6B is a schematic view illustrating a base of the gas detection main part according to the embodiment of the present disclosure.
Figure 6C:
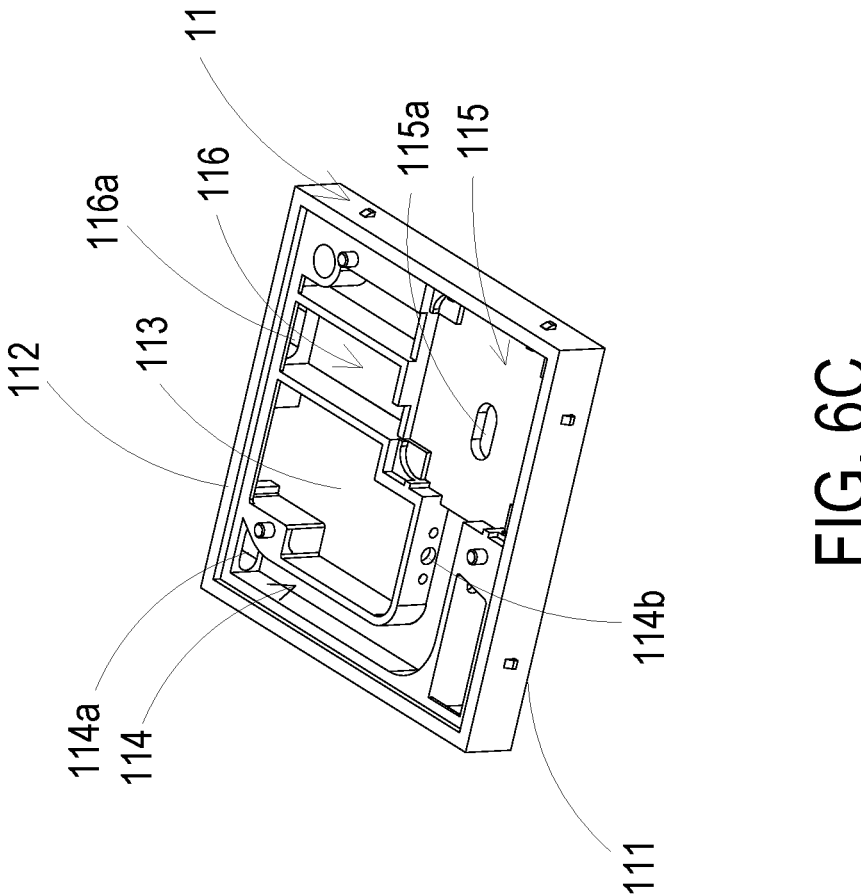
FIG. 6C is a schematic view illustrating the base of the gas detection main part according to the embodiment of the present disclosure from another view angle.
Figure 7:
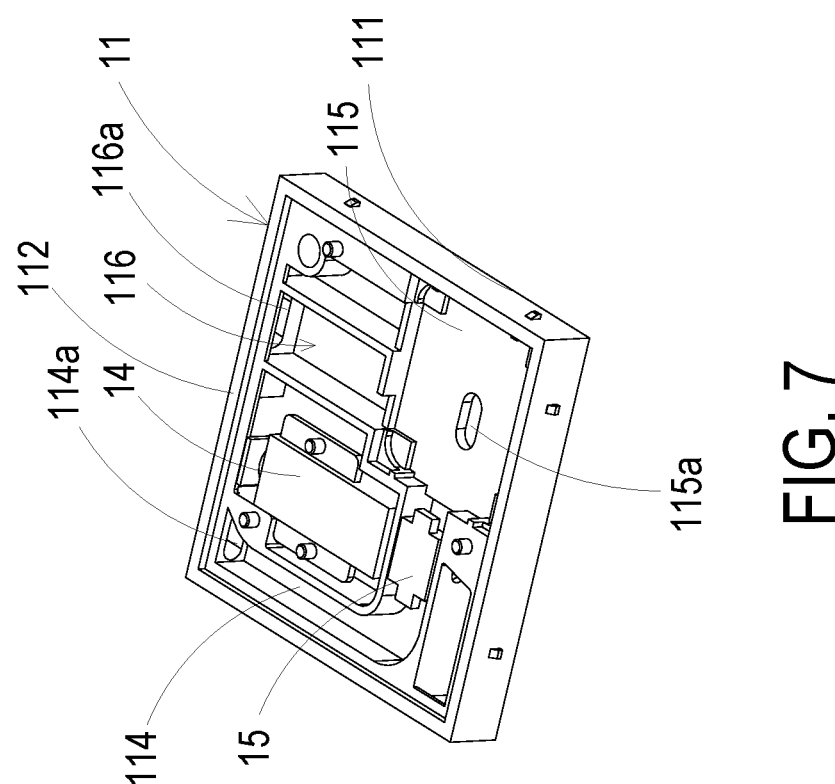
FIG. 7 is a schematic view illustrating the base of the gas detection main part with a laser component and a particulate sensor accommodated therein according to an embodiment of the present disclosure.
Figure 8A:
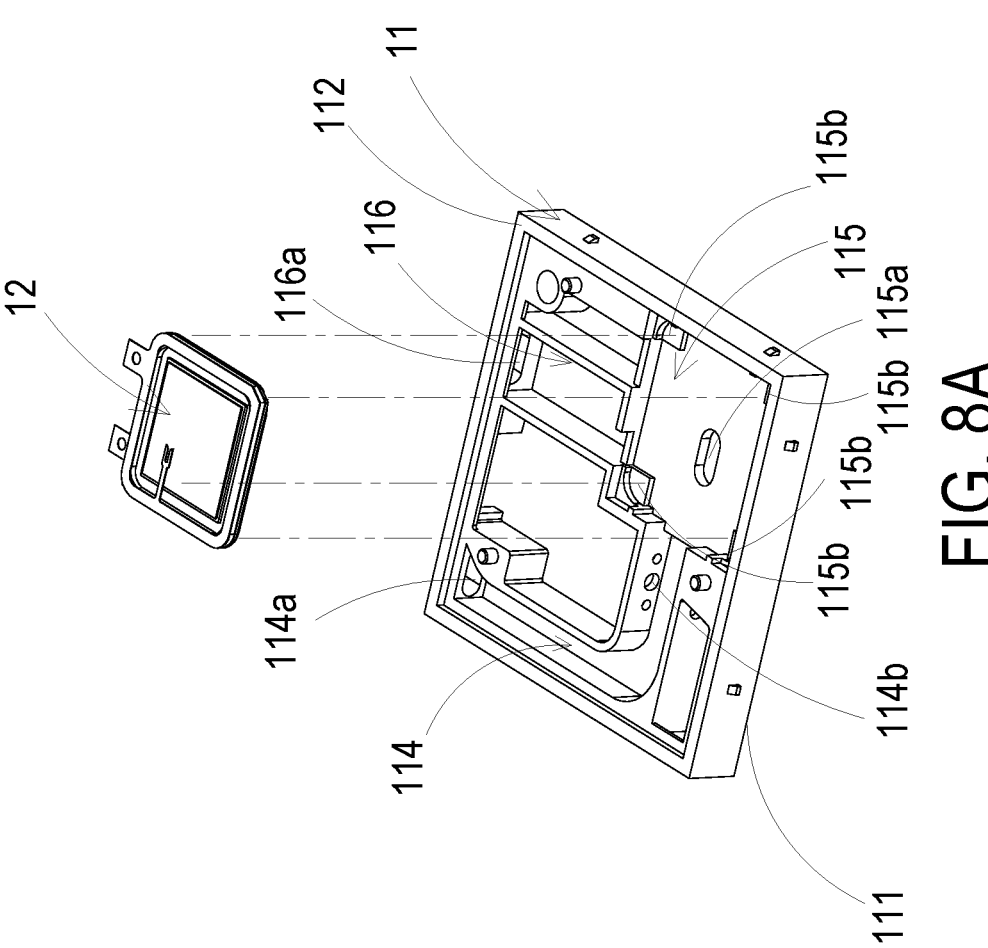
FIG. 8A is a schematic exploded view illustrating a piezoelectric actuator of the gas detection main part combining with the base according to an embodiment of the present disclosure.
Figure 8B:
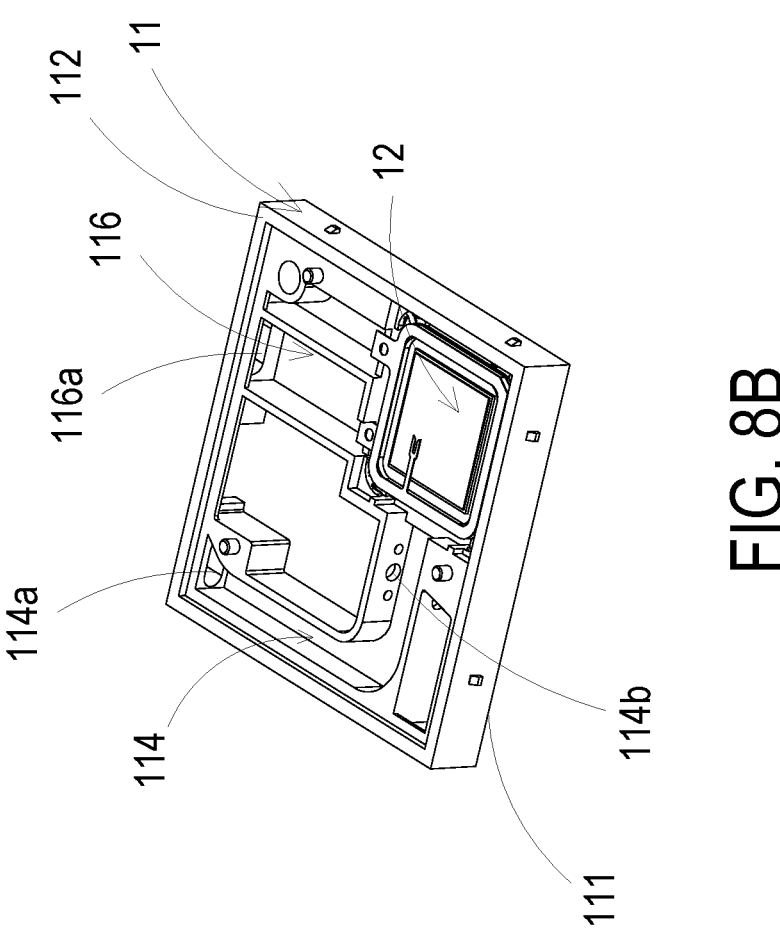
FIG. 8B is a schematic view illustrating the piezoelectric actuator of the gas detection main part combined with the base according to the embodiment of the present disclosure.
Figure 11A:
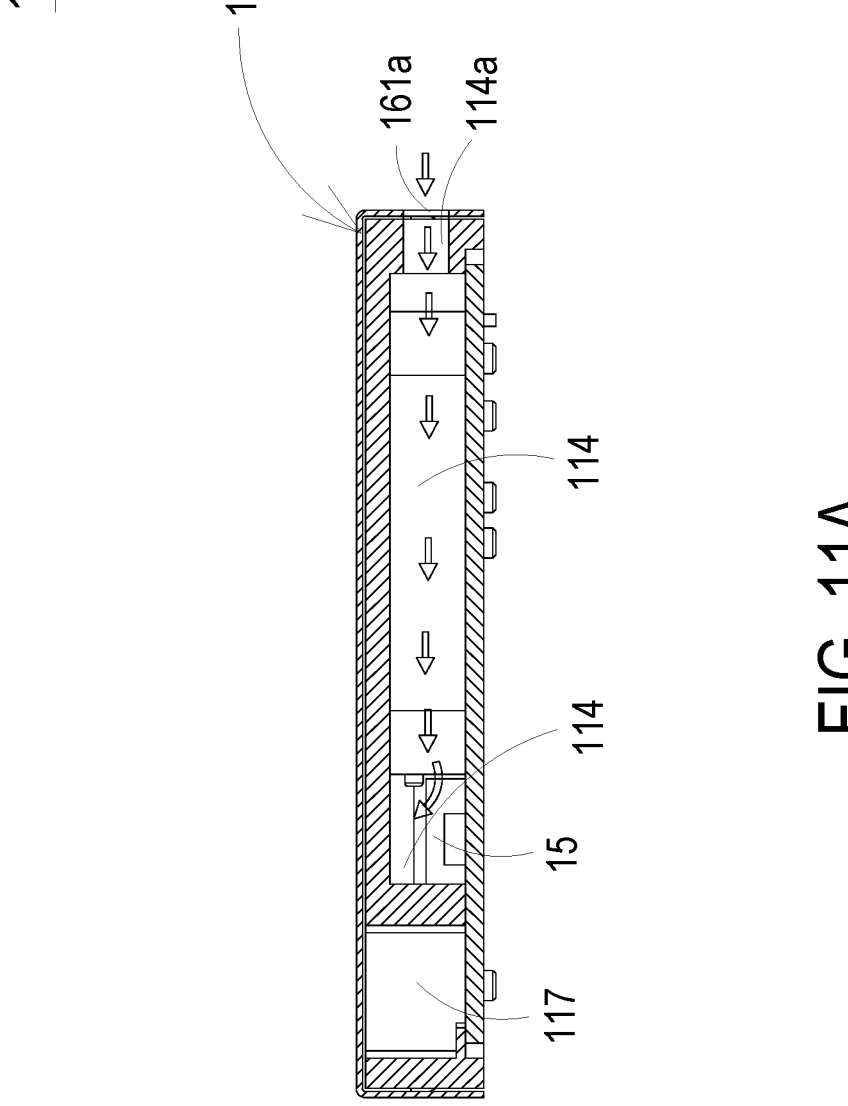
FIG. 11A to FIG. 11C are schematic views illustrating a gas flowing path of the gas detection main part according to an embodiment of the present disclosure.

Please refer to FIG. 5, FIGS. 6A to 6C, FIG. 7 and FIGS. 8A to 8B. The gas detection main part 1b above-mentioned includes a base 11, a piezoelectric actuator 12, a driving circuit board 13, a laser component 14, a particulate sensor 15 and an outer cover 16. In the embodiment, the base 11 includes a first surface 111, a second surface 112, a laser loading region 113, a gas-inlet groove 114, a gas-guiding-component loading region 115 and a gas-outlet groove 116. The first surface 111 and the second surface 112 are two surfaces opposite to each other. The laser loading region 113 is hollowed out from the first surface 111 toward the second surface 112. The gas-inlet groove 114 is concavely formed from the second surface 112 and disposed adjacent to the laser loading region 113. The gas-inlet groove 114 includes a gas-inlet 114a which is in communication with the outside the base 11, and is spatially corresponding in position to an inlet opening 161a of the outer cover 16. A transparent window 114b is opened on two lateral walls of the gas-inlet groove 114 and is in communication with the laser loading region 113. Therefore, when the first surface 111 of the base 11 is covered and attached by the outer cover 16, and the second surface 112 is covered and attached by the driving circuit board 13, an inlet path is defined by the gas-inlet groove 114 (as shown in FIG. 7 and FIG. 11A).

As shown in FIG. 6A to FIG. 6C, the gas-guiding-component loading region 115 mentioned above is concavely formed from the second surface 112 and in communication with the gas-inlet groove 114 and has a ventilation hole 115a penetrating a bottom surface thereof. The gas-outlet groove 116 mentioned above includes a gas-outlet 116a, and the gas-outlet 116a is spatially corresponding to the outlet opening 161b of the outer cover 16. The gas-outlet groove 116 includes a first section 116b and a second section 116c. The first section 116b is concavely formed from the first surface 111 in a region spatially corresponding to a vertical projection area of the gas-guiding-component loading region 115. The second section 116c is hollowed out from the first surface 111 to the second surface 112 in a region where the first surface 111 is misaligned with the vertical projection area of the gas-guiding-component loading region 115 and extended therefrom. The first section 116b and the second section 116c are connected to form a stepped structure. In addition, the first section 116b of the gas-outlet groove 116 is in communication with the ventilation hole 115a of the gas-guiding-component loading region 115, and the second section 116c of the gas-outlet groove 116 is in communication with the gas-outlet 116a. Therefore, when the first surface 111 of the base 11 is attached and covered by the outer cover 16 and the second surface 112 of the base 11 is attached and covered by the driving circuit board 13, an outlet path is defined by the gas-outlet groove 116 (as shown in FIG. 11B to FIG. 11C).

As shown in FIG. 6A and FIG. 7, the laser component 14 and the particulate sensor 15 mentioned above are disposed on the driving circuit board 13 and located within the base 11. In order to clearly describe and illustrate the positions of the laser component 14 and the particulate sensor 15 in the base 11, the driving circuit board 13 is intentionally omitted in FIG. 7. Please refer FIG. 6A, FIG. 7 and FIG. 12, the laser component 14 is accommodated in the laser loading region 113 of the base 11, and the particulate sensor 15 is accommodated in the gas-inlet groove 114 of the base 11 and is aligned to the laser component 14. In addition, the laser component 14 is spatially corresponding to the transparent window 114b. The transparent window 114b is provided for passing therethough a light beam emitted by the laser component 14, so that the light beam enters the gas-inlet groove 114. A light beam path from the laser component 14 passes through the transparent window 114b and extends in an orthogonal direction perpendicular to the gas-inlet groove 114. In the embodiment, the light beam emitted by the laser component 14 passes through the transparent window 114b and enters the gas-inlet groove 114 to irradiate the suspended particles contained in the gas passing through the gas-inlet groove 114. When the suspended particles contained in the gas are irradiated and generate scattered light spots, the scattered light spots are detected and calculated by the particulate sensor 15 to obtain related information about the particle sizes and the concentration of the suspended particles contained in the gas. In one embodiment, the particulate sensor 15 is a PM2.5 sensor.

Figure 11B:
Figure 11B:
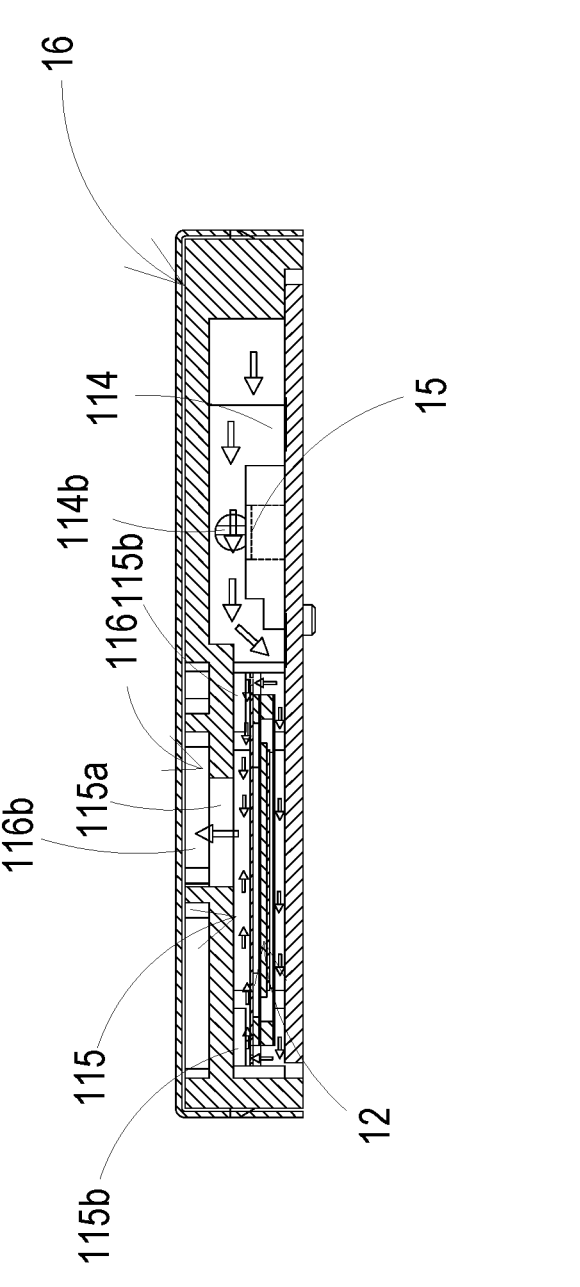
Figure 11C:
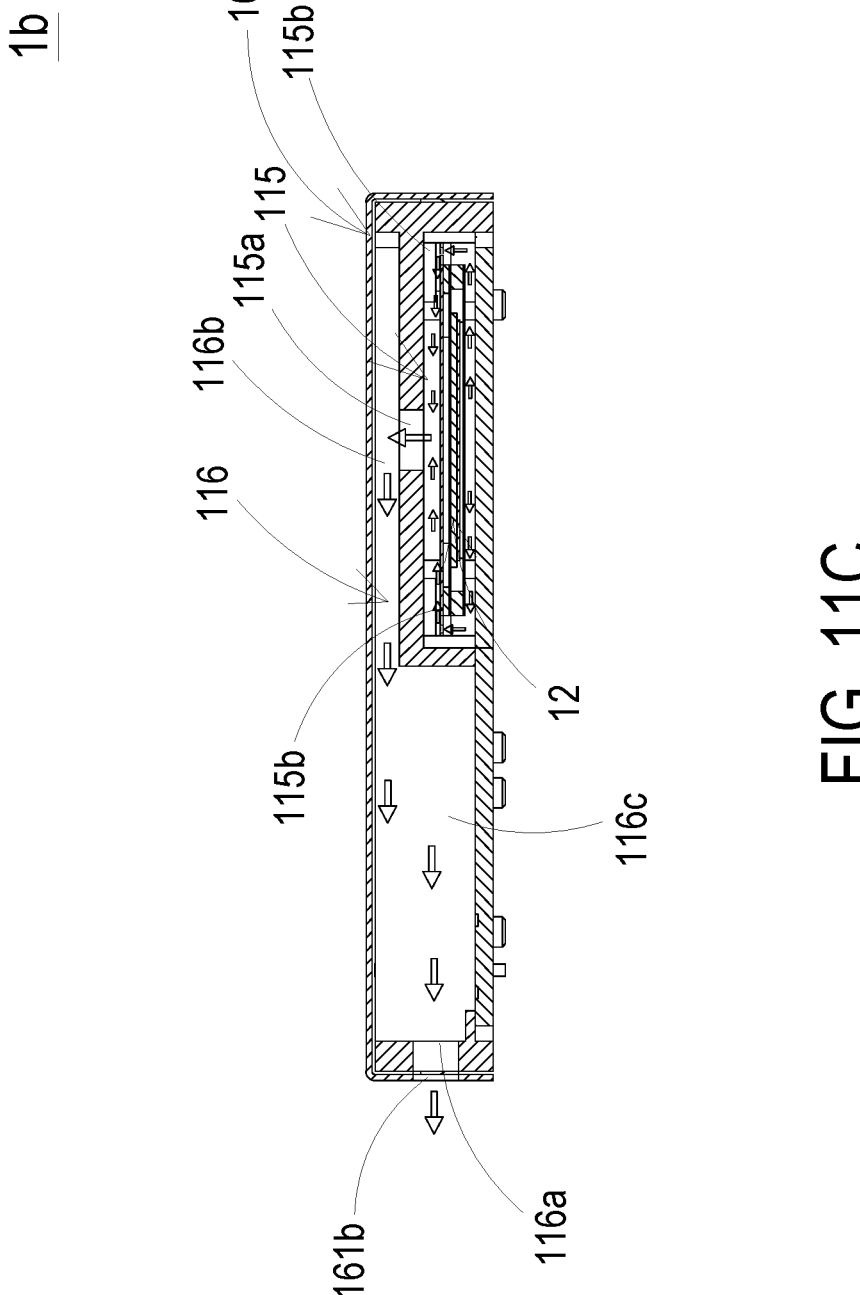

As shown in FIG. 8A, FIG. 8B, FIG. 11B and FIG. 11C, the piezoelectric actuator 12 mentioned above is accommodated in the gas-guiding-component loading region 115 of the base 11. The gas-guiding-component loading region 115 has a square-shape, and four corners of the gas-guiding-component loading region 115 respectively have a positioning protrusion 115b disposed thereon. As shown in FIG. 7, FIG. 11B and FIG. 11C, the gas-guiding-component loading region 115 is in communication with the gas-inlet groove 114. When the piezoelectric actuator 12 is enabled, the gas in the gas-inlet 114 is inhaled into the piezoelectric actuator 12, passes through the ventilation hole 115a of the gas-guiding-component loading region 115, and enters the gas-outlet groove 116.

As shown in FIG. 5 and FIG. 6A, the driving circuit board 13 mentioned above covers the second surface 112 of the base 11. The laser component 14 is positioned and disposed on and electrically connected to the driving circuit board 13. The particulate sensor 15 is also positioned and disposed on and electrically connected to the driving circuit board 13. The outer cover 16 covers the base 11 and includes a side plate 161, wherein the outer cover 16 is covered and attached to the first surface 111 of the base 11, and the side plate 161 has an inlet opening 161a and an outlet opening 161b. When the outer cover 16 covers the base 11, the inlet opening 161a is spatially corresponding to the gas-inlet 114a of the base 11 (as shown in FIG. 11A), and the outlet opening 161b is spatially corresponding to the gas-outlet 116a of the base 11 (As shown in FIG. 11C).

Figure 9:
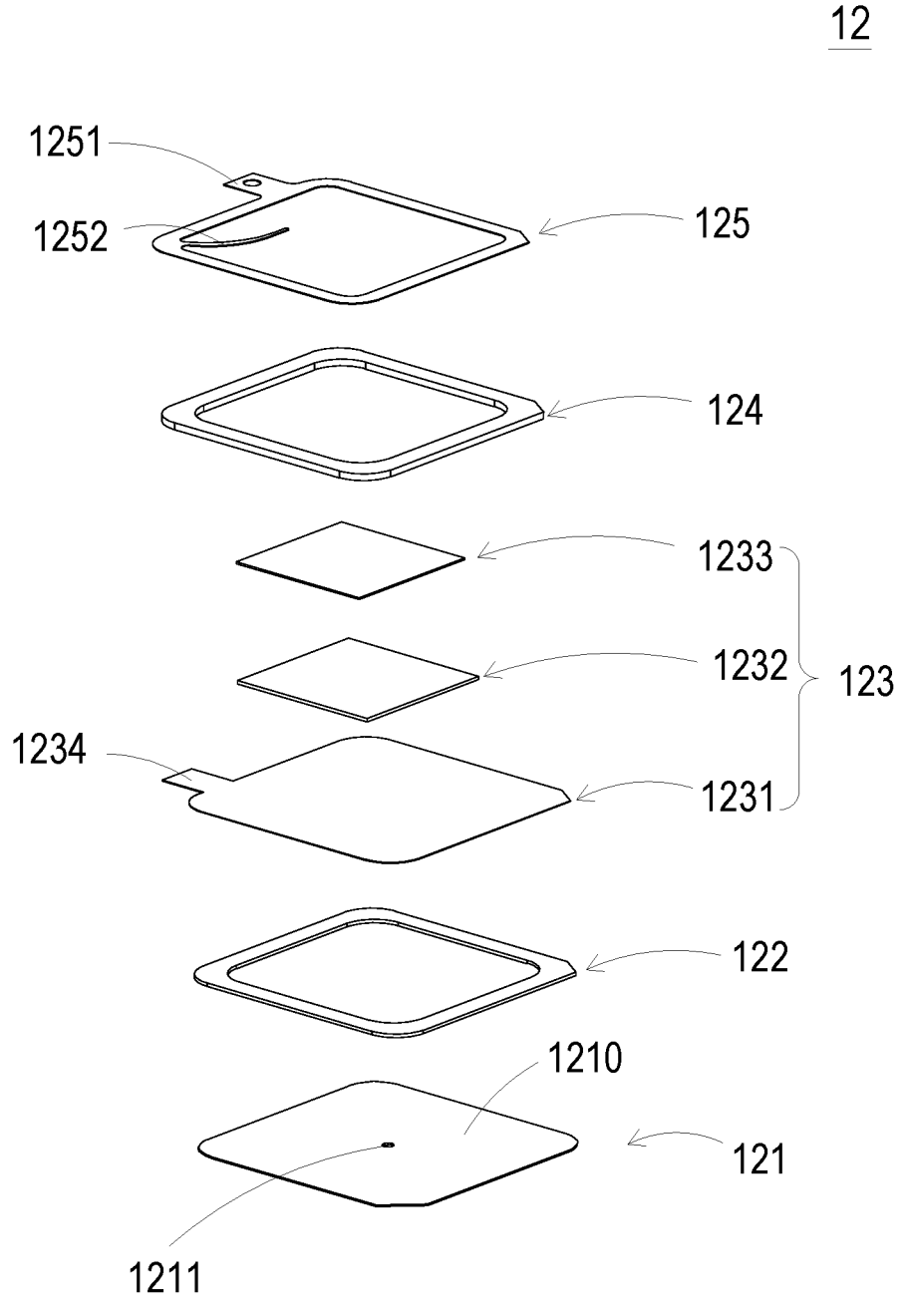
FIG. 9 is a schematic exploded view illustrating the piezoelectric actuator of the gas detection main part according to the embodiment of the present disclosure.

Please refer to FIG. 9, the piezoelectric actuator 12 mentioned above includes a gas-injection plate 121, a chamber frame 122, an actuator element 123, an insulation frame 124 and a conductive frame 125. In the embodiment, the gas-injection plate 121 is made by a flexible material and includes a suspension plate 1210 and a hollow aperture 1211. The suspension plate 1210 is a sheet structure which is permitted to undergo a bending deformation. Preferably but not exclusively, the shape and the size of the suspension plate 1210 are substantially corresponding to the inner edge of the gas-guiding-component loading region 115, but not limited thereto. The shape of the suspension plate 1210 is selected from the group consisting of a square, a circle, an ellipse, a triangle and a polygon. The hollow aperture 1211 penetrates through a center of the suspension plate 1210, so as to allow the gas to flow therethrough. The chamber frame 122 mentioned above is carried and stacked on the gas-injection plate 121, and the shape of the chamber frame 122 is corresponding to the gas-injection plate 121. The actuator element 123 is carried and stacked on the chamber frame 122 so as to collaboratively define a resonance chamber 126 with the chamber frame 122 and the suspension plate 1210 therebetween. The insulation frame 124 is carried and stacked on the actuator element 123 and the appearance of the insulation frame 124 is similar to that of the chamber frame 122. The conductive frame 125 is carried and stacked on the insulation frame 124, and the appearance of the conductive frame 125 is similar to that of the insulation frame 124. The conductive frame 125 includes a conducting pin 1251 and a conducting electrode 1252. The conducting pin 1251 is extended outwardly from an outer edge of the conductive frame 125, and the conducting electrode 1252 is extended inwardly from an inner edge of the conductive frame 125. Moreover, the actuator element 123 further includes a piezoelectric carrying plate 1231, an adjusting resonance plate 1232 and a piezoelectric plate 1233. The piezoelectric carrying plate 1231 is carried and stacked on the chamber frame 122. The adjusting resonance plate 1232 is carried and stacked on the piezoelectric carrying plate 1231. The piezoelectric plate 1233 is carried and stacked on the adjusting resonance plate 1232. The adjusting resonance plate 1232 and the piezoelectric plate 1233 are accommodated in the insulation frame 124. The conducting electrode 1252 of the conductive frame 125 is electrically connected to the piezoelectric plate 1233. In the embodiment, the piezoelectric carrying plate 1231 and the adjusting resonance plate 1232 are made by a conductive material. The piezoelectric carrying plate 1231 includes a piezoelectric pin 1234. The piezoelectric pin 1234 and the conducting pin 1251 are electrically connected to a driving circuit (not shown) on the driving circuit board 13, so as to receive a driving signal (such as a driving frequency and a driving voltage). Moreover, the piezoelectric pin 1234, the piezoelectric carrying plate 1231, the adjusting resonance plate 1232, the piezoelectric plate 1233, the conducting electrode 1252, the conductive frame 125 and the conducting pin 1251 form a circuit loop, in which the insulation frame 124 provides insulation between the conductive frame 125 and the actuator element 123 for avoiding the occurrence of a short circuit, thereby allowing the driving signal to be transmitted to the piezoelectric plate 1233. After receiving the driving signal (the driving frequency and the driving voltage), the piezoelectric plate 1233 deforms due to the piezoelectric effect, and the piezoelectric carrying plate 1231 and the adjusting resonance plate 1232 are further driven to generate the bending deformation in a reciprocating manner. In the embodiment, the adjusting resonance plate 1232 is located between the piezoelectric plate 1233 and the piezoelectric carrying plate 1231 and served as a cushion therebetween, so as to adjust the vibration frequency of the piezoelectric carrying plate 1231. Basically, the thickness of the adjusting resonance plate 1232 is greater than the thickness of the piezoelectric carrying plate 1231, and the vibration frequency of the actuator element 123 can be adjusted by adjusting the thickness of the adjusting resonance plate 1232.

Figure 10A:
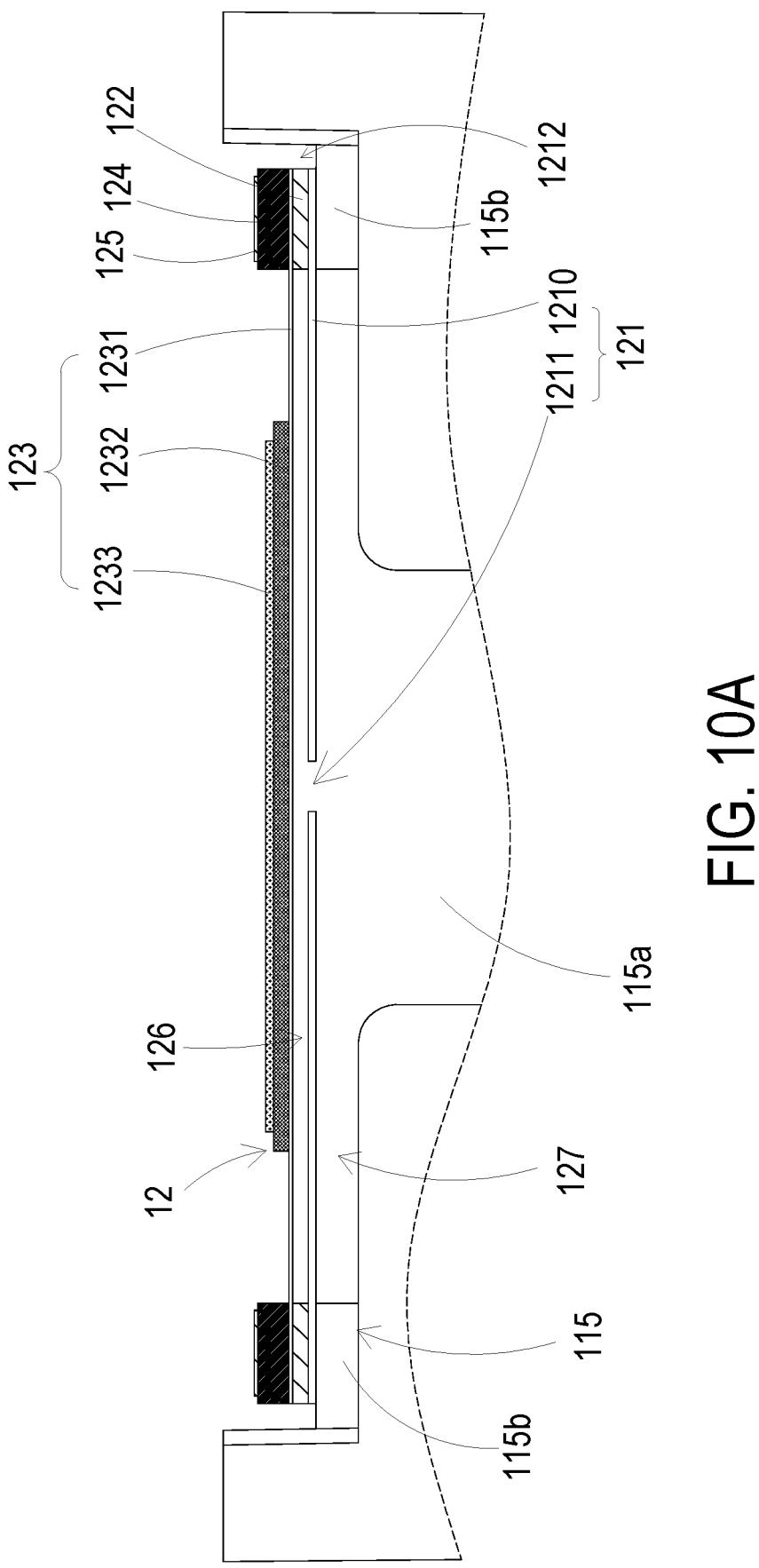
FIG. 10A is a schematic view illustrating the piezoelectric actuator of the gas detection main part combined in a gas-guiding-component loading region according to an embodiment of the present disclosure.

Please refer to FIG. 9 and FIG. 10A. The gas-injection plate 121, the chamber frame 122, the actuator element 123, the insulation frame 124 and the conductive frame 125 are stacked and positioned in the gas-guiding-component loading region 115 sequentially, so that the piezoelectric actuator 12 is disposed and positioned in the gas-guiding-component loading region 115 and supported and positioned on the positioning protrusions 115b. Therefore, a clearance 1212 is defined between the suspension plate 1210 of the piezoelectric actuator 12 and an inner edge of the gas-guiding-component loading region 115 for gas flowing therethrough.

Please refer to FIG. 10A, a flowing chamber 127 is formed between the gas-injection plate 121 and the bottom surface of the gas-guiding-component loading region 115. The flowing chamber 127 is in communication with the resonance chamber 126, which is located between the actuator element 123, the chamber frame 122 and the suspension plate 1210, through the hollow aperture 1211 of the gas-injection plate 121. By controlling the vibration frequency of the gas in the resonance chamber 126 to be close to the vibration frequency of the suspension plate 1210, the Helmholtz resonance effect is generated between the resonance chamber 126 and the suspension plate 1210, so as to improve the efficiency of gas transportation.

Figure 10B:
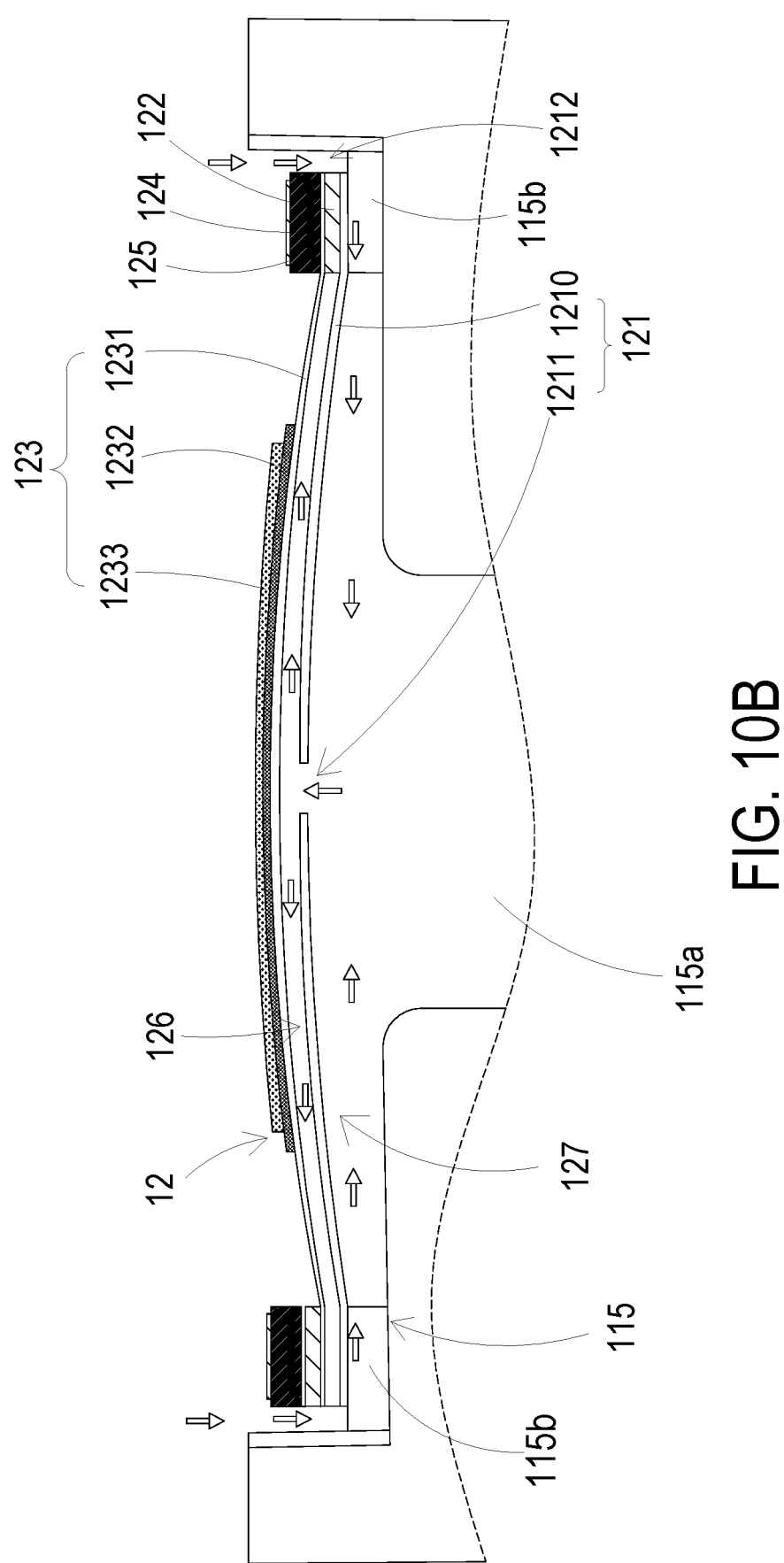
FIG. 10B and FIG. 10C are schematic views illustrating operation steps of the piezoelectric actuator in FIG. 10A.
Figure 10C:
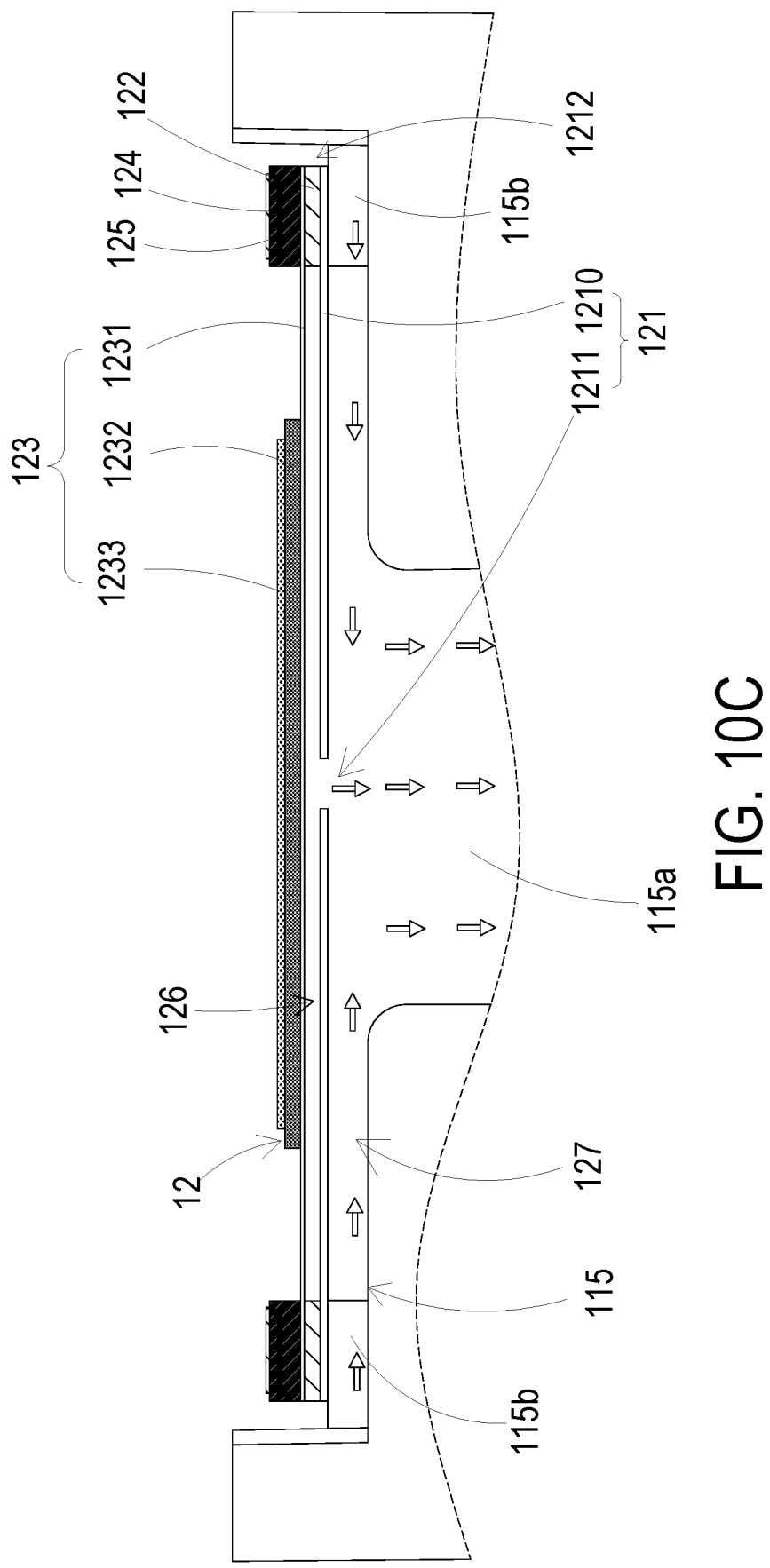

As shown in FIG. 10B, when the piezoelectric plate 1233 is moved away from the bottom surface of the gas-guiding-component loading region 115, the suspension plate 1210 of the gas-injection plate 121 is driven by the piezoelectric plate 1233 to move away from the bottom surface of the gas-guiding-component loading region 115. Therefore, the volume of the flowing chamber 127 is expanded rapidly, the internal pressure of the flowing chamber 127 is decreased to form a negative pressure, and the gas outside the piezoelectric actuator 12 is inhaled through the clearance 1212 and enters the resonance chamber 126 through the hollow aperture 1211. Consequently, the pressure in the resonance chamber 126 is increased to generate a pressure gradient. As shown in FIG. 10C, when the suspension plate 1210 of the gas-injection plate 121 is driven by the piezoelectric plate 1233 to move toward the bottom surface of the gas-guiding-component loading region 115, the gas in the resonance chamber 126 is discharged out rapidly through the hollow aperture 1211, and the gas in the flowing chamber 127 is compressed, so that the converged gas is quickly and massively ejected out under the condition close to an ideal gas state of the Benulli's law and transported to the ventilation hole 115a of the gas-guiding-component loading region 115. Consequently, by repeating the operation steps shown in FIG. 10B and FIG. 10C, the piezoelectric plate 1233 is driven to generate the bending deformation in a reciprocating manner. According to the principle of inertia, since the gas pressure inside the resonance chamber 126 is lower than the equilibrium gas pressure after the converged gas is ejected out, the gas is introduced into the resonance chamber 126 again. Moreover, the vibration frequency of the gas in the resonance chamber 126 is controlled to be close to the vibration frequency of the piezoelectric plate 1233, so as to generate the Helmholtz resonance effect to achieve the gas transportation at high speed and in large quantities.

As shown in FIG. 11A, the gas is inhaled through the inlet opening 161a of the outer cover 16, flows into the gas-inlet groove 114 of the base 11 through the gas-inlet 114a, and is transported to the position of the particulate sensor 15. As shown in FIG. 11B, the piezoelectric actuator 12 is enabled continuously to inhale the gas into the inlet path for facilitating the gas outside the gas detection main part to be introduced rapidly, flow stably, and pass above the particulate sensor 15. At this time, a light beam emitted by the laser component 14 passes through the transparent window 114b and enters the gas-inlet groove 114 to irritate the suspended particles contained in the gas flowing above the particulate sensor 15 in the gas-inlet groove 114. When the suspended particles contained in the gas are irradiated and generate scattered light spots, the scattered light spots are detected and calculated by the particulate sensor 15 for obtaining related information about the particle sizes and the concentration of the suspended particles contained in the gas. Moreover, the gas above the particulate sensor 15 is continuously driven and transported by the piezoelectric actuator 12 so as to flow through the ventilation hole 115a of the gas-guiding-component loading region 115 and enter the first section 116b of the gas-outlet groove 116. At last, as shown in FIG. 11C, after the gas flows into the first section 116b of the gas outlet groove 116, since the gas is continuously transported into the first section 116b by the piezoelectric actuator 12, the gas in the first section 116b is pushed to the second section 11c and discharged through the gas-outlet 116a and the outlet opening 161b.

Figure 12:
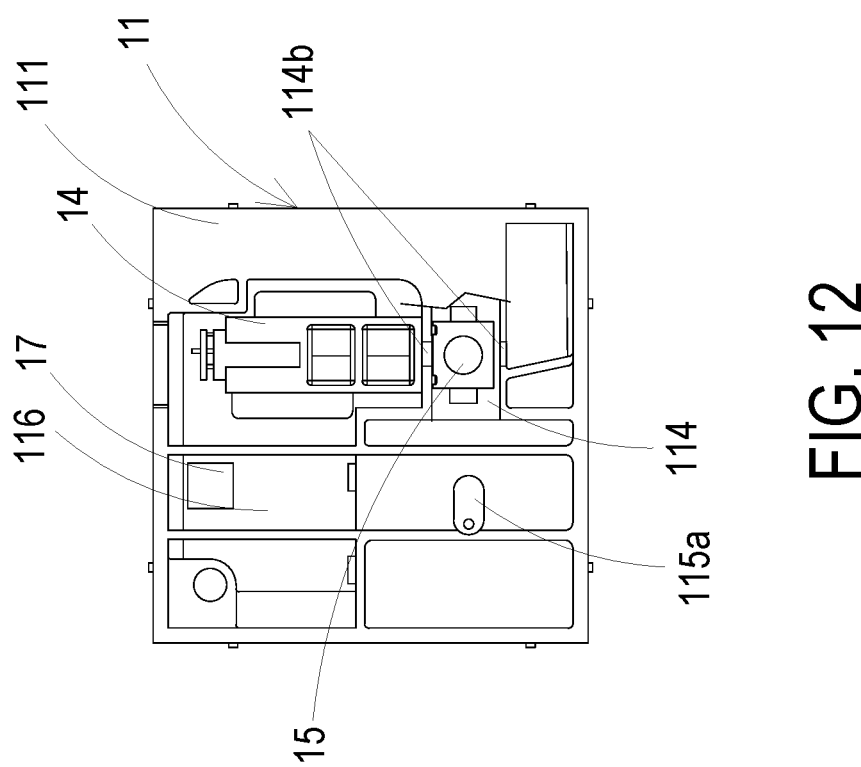
FIG. 12 is a schematic view illustrating a position of a gas sensor in the gas detection main part and a light beam path emitted from the laser component according to an embodiment of the present disclosure.

Please refer to FIG. 5 and FIG. 12, the configuration of the gas detection module 1 of the present disclosure can detect not only the existence of the suspended particles in the gas, but also the property of the gas, such as formaldehydes, carbon dioxide, total volatile organic compounds, bacteria, fungi, viruses etc. Therefore, in an embodiment, the gas detection module 1 of the present disclosure further includes a gas sensor 17 positioned and disposed on and electrically connected to the driving circuit board 13 and accommodated in the gas-outlet groove 116 (as shown in FIG. 12), so as to detect the gas introduced into the gas-outlet groove 116.

In conclusion, the present disclosure provides a device for detecting gas and controlling volume of clean gas which combines a gas detection module with at least one gas guider. Through the gas detection module detects a gas to generate a gas detection data and converts the gas detection data into at least one power signal and a pulse-width modulation signal for outputting to the gas guider, the gas guider is enabled or disabled, and the rotation speed thereof and the output volume of clean gas therefrom are adjusted accordingly. Therefore, the air quality can be monitored in real time and the output volume of clean gas can be controlled based on the air quality, thereby achieving a best benefit of improving and purifying the air quality near a user.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for detecting gas and controlling volume of clean gas, comprising:
   a gas detection module comprising a control circuit board, a gas detection main part and a microprocessor, wherein the gas detection main part detects a gas to generate a signal and transmits the signal to the microprocessor for calculating and processing so as to generate a gas detection data, and the microprocessor outputs at least one power signal and a pulse-width modulation (PWM) signal according to the gas detection data; and

9 at least one gas guider receiving the at least one power signal and the PWM signal outputted by the microprocessor, wherein the at least one gas guider is enabled or disabled, as well as a rotation speed and an output volume of clean gas of the at least one gas guider are adjusted according to the at least one power signal and the PWM signal, wherein the gas detection main part comprises:

a base comprising:

a first surface;

a second surface opposite to the first surface;

a laser loading region hollowed out from the first surface to the second surface;

a gas-inlet groove concavely formed from the second surface and disposed adjacent to the laser loading region, wherein the gas-inlet groove comprises a gas-inlet and a transparent window opened on two lateral walls thereof and in communication with the laser loading region;

a gas-guiding-component loading region concavely formed by the second surface and in communication with the gas-inlet groove, and having a ventilation hole penetrated a bottom surface thereof, wherein each of four corners of the gas-guiding-component loading region respectively comprises a positioning protrusion; and a gas-outlet groove concavely formed from a region of the first surface spatially corresponding to the bottom surface of the gas-guiding-component loading region and hollowed out from the first surface to the second surface in a region where the first surface is misaligned with the gas-guiding-component loading region, wherein the gas-outlet groove is in communication with the ventilation hole and comprises a gas-outlet mounted thereon;

a piezoelectric actuator accommodated in the gasguiding-component loading region;

a driving circuit board covering and attaching to the second surface of the base;

a laser component positioned on and electrically connected to the driving circuit board, and accommodated in the laser loading region, wherein a light beam path emitted by the laser component passes through the transparent window and extends in an orthogonal direction perpendicular to the gas-inlet groove;

a particulate sensor positioned on and electrically connected to the driving circuit board, and accommodated in the gas-inlet groove at a region in an orthogonal direction perpendicular to the light beam path emitted by the laser component for detecting suspended particles in the air passing through the gas-inlet groove and irradiated by a light beam emitted from the laser component; and an outer cover covering the first surface of the base and comprising a side plate, wherein the side plate comprises an inlet opening and an outlet opening at positions spatially corresponding to the gas-inlet and the gas-outlet of the base respectively, wherein the inlet opening is spatially corresponding to the gas-inlet of the base and the outlet opening is spatially corresponding to the gas-outlet of the base, wherein the first surface of the base is covered by the outer cover, and the second surface of the base is covered by the driving circuit board, thereby an inlet path is defined by the gas-inlet groove and an outlet path is defined by the gas-outlet groove, by which the piezoelectric actuator introduces the air outside the gas-inlet of the base into the inlet path defined by the gas-inlet groove through the inlet opening to pass the particulate sensor, the particulate sensor detects a concentration of the suspended particles contained in the air, and the air is guided by the piezoelectric actuator to enter the outlet path defined by the gas-outlet groove through the ventilation hole and discharged through the gas-outlet of the base and the outlet opening.

2. The device for detecting gas and controlling volume of clean gas as claimed in claim 1, wherein the piezoelectric actuator comprises:

a gas-injection plate comprising a suspension plate capable of bending and vibrating and a hollow aperture formed at a center of the suspension plate;

a chamber frame carried and stacked on the suspension plate;

an actuator element carried and stacked on the chamber frame for bending and vibrating in a reciprocating manner after receiving a voltage;

an insulation frame carried and stacked on the actuator element; and a conductive frame carried and stacked on the insulation frame;

wherein the gas-injection plate is supported and positioned on the positioning protrusions of the gas-guiding-component loading region, so that a clearance is defined between the gas-injection plate and an inner edge of the gas-guiding-component loading region for flowing the gas therethrough, a flowing chamber is formed between the gas-injection plate and the bottom surface of the gas-guiding-component loading region, and a resonance chamber is collaboratively defined by the actuator element, the chamber frame and the suspension plate, by which through driving the actuator element to drive the gas-injection plate to resonate, the suspension plate of the gas-injection plate generates vibration and displacement in a reciprocating manner, so as to inhale the gas into the flowing chamber through the clearance and then eject out for completing a gas flow transmission.

3. The device for detecting gas and controlling volume of clean gas as claimed in claim 2, wherein the actuator element comprises:

a piezoelectric carrying plate carried and stacked on the chamber frame;

an adjusting resonance plate carried and stacked on the piezoelectric carrying plate; and a piezoelectric plate carried and stacked on the adjusting resonance plate for driving the piezoelectric carrying plate and the adjusting resonance plate to bend and vibrate in a reciprocating manner after receiving the voltage.

4. The device for detecting gas and controlling volume of clean gas as claimed in claim 1, further comprising a gas sensor disposed on and electrically connected to the driving circuit board of the gas detection module.

5. The device for detecting gas and controlling volume of clean gas as claimed in claim 4, wherein the gas sensor is a volatile-organic-compound sensor for detecting gas information of carbon dioxide or volatile organic compounds.

6. The device for detecting gas and controlling volume of clean gas as claimed in claim 4, wherein the gas sensor is a formaldehyde sensor for detecting gas information of formaldehyde.

7. The device for detecting gas and controlling volume of clean gas as claimed in claim 4, wherein the gas sensor is a bacteria sensor for detecting information of bacteria or fungi.

8. The device for detecting gas and controlling volume of clean gas as claimed in claim 4, wherein the gas sensor is a virus sensor for detecting information of virus.

9. The device for detecting gas and controlling volume of clean gas as claimed in claim 1, wherein the gas detection module comprises a communicator integrally packaged on and electrically connected to the control circuit board with the gas detection main part and the microprocessor, in addition, the microprocessor receives, calculates and processes the signal generated after detecting the gas to generate the gas detection data for providing to the communicator to perform an external transmission.

10. The device for detecting gas and controlling volume of clean gas as claimed in claim 9, wherein the communicator transmits the gas detection data to an external device, and the external device displays the gas detection data and generates a notification alert.

11. The device for detecting gas and controlling volume of clean gas as claimed in claim 10, wherein the external device is a mobile device.

12. The device for detecting gas and controlling volume of clean gas as claimed in claim 10, further comprising a second gas detection main part for detecting and outputting another gas detection data to the external device, wherein the external device receives the another gas detection data and transmits thereof to the microprocessor via the communicator, and the microprocessor receives, calculates and processes the another gas detection data for outputting the at least one power signal and the PWM signal to the at least one gas guider, so as to enable or disable the at least one gas guider and adjust the rotation speed thereof and the output volume of clean gas therefrom.

13. The device for detecting gas and controlling volume of clean gas as claimed in claim 1, wherein the microprocessor transmits the at least one power signal and the PWM signal to the at least one gas guider through a wire, and a relay is disposed on the wire to form a buffer switch for achieving a voltage protection for the microprocessor.

14. The device for detecting gas and controlling volume of clean gas as claimed in claim 1, further comprising a filter material for filtering and purifying the gas introduced into the at least one gas guider.

15. The device for detecting gas and controlling volume of clean gas as claimed in claim 1, wherein the at least one gas guider is a direct current (DC) fan.

* * * * *